Patented Feb. 7, 1950

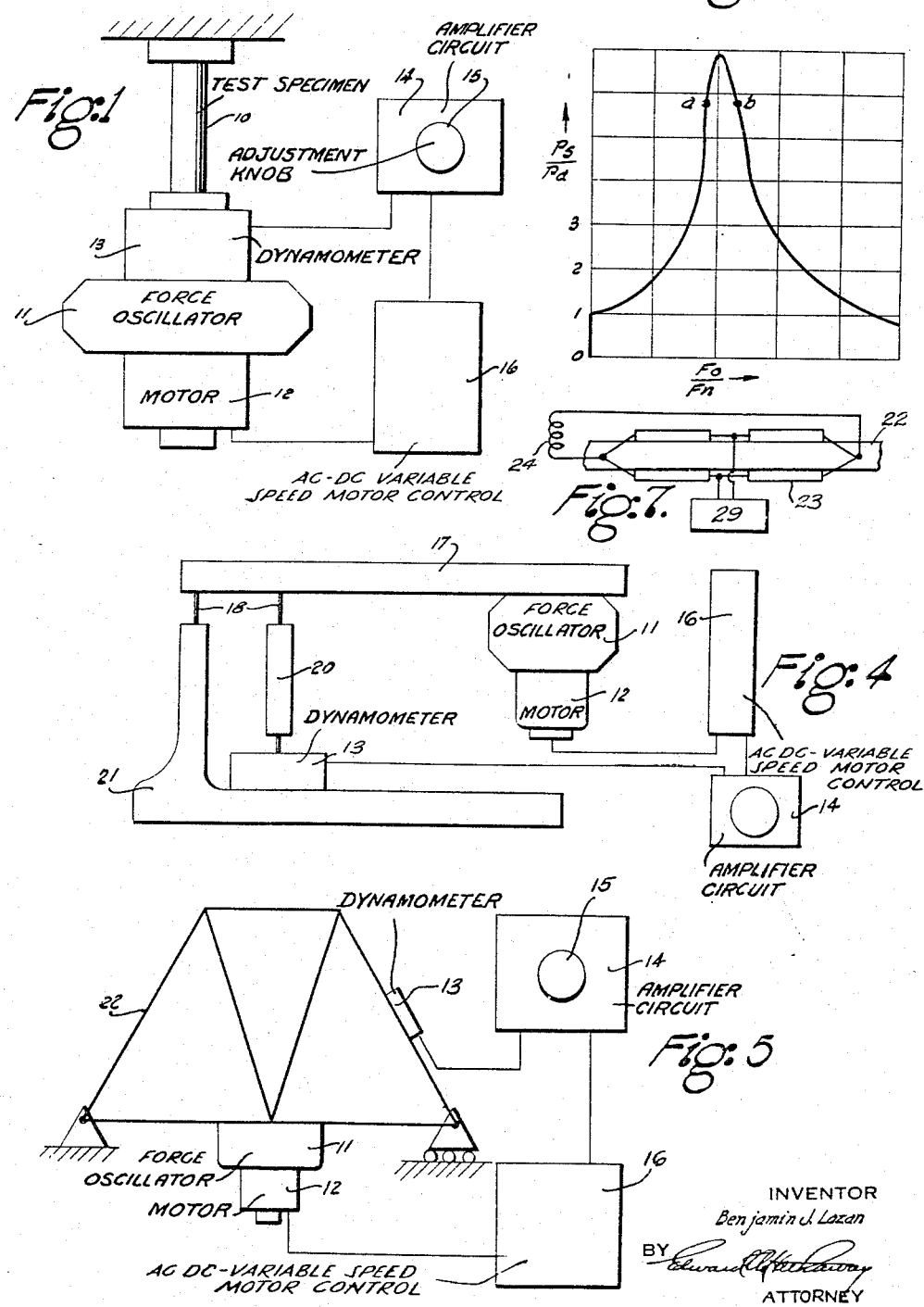
Feb. 7, 1950 — B. J. LAZAN — 2,496,632
VIBRATION TESTING APPARATUS
Filed Dec. 14, 1944 — 2 Sheets-Sheet 1
INVENTOR
Benjamin J. Lazan

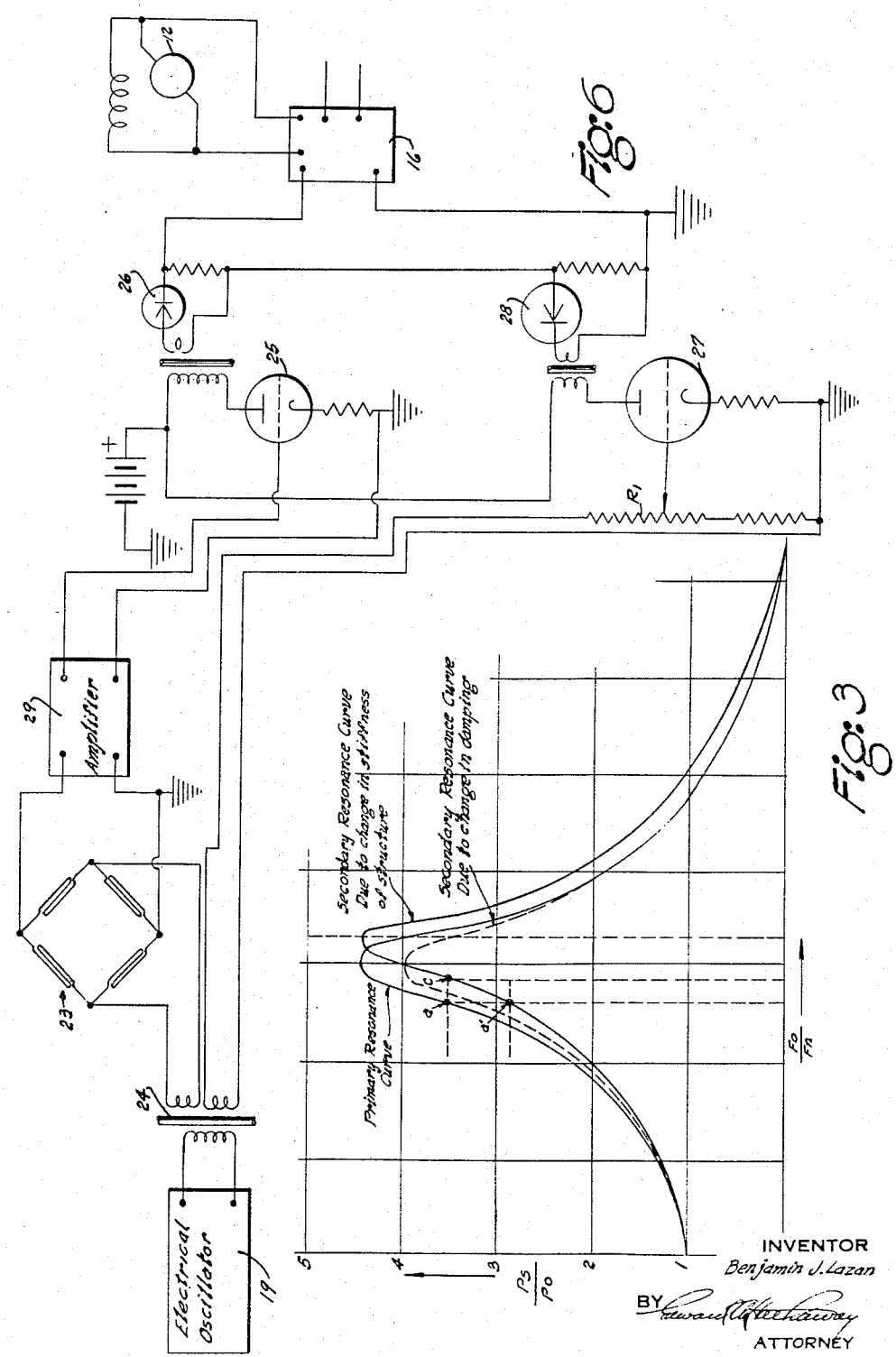

2,496,632

UNITED STATES PATENT OFFICE 2,496,632

VIBRATION TESTING APPARATUS

Benjamin J. Lazan, Greenwich, Conn., assignor, by mesne assignments, to The Baldwin Locomotive Works, a corporation of Pennsylvania Application December 14, 1944, Serial No. 568,110

5 Claims. (Cl. 73—67)

This invention relates generally to dynamic testing and more particularly to vibration testing apparatus for applying and maintaining a vibratory force of predetermined magnitude in a specimen or structure.

Vibration testing may be used for determining the fatigue characteristics of specimens or structures or for studying the stress distribution in a structure by producing a predetermined vibratory force therein. In some instances, it is possible to produce a vibrating force in the specimen or structure directly equal to the applied force, but in other instances where the test member is a large and massive structure like a bridge, such direct force producing apparatus would be so large as to be prohibitive. Even though it is possible in some instances to produce a direct vibrating force within certain test members, nevertheless it is preferable in many instances to use a relatively small vibratory force applied to the specimen or structure and then utilize the resonance characteristics of the test member to increase or amplify many times the effects of the applied force. This allows a small and relatively inexpensive force producing device to be used. Heretofore it has been attempted to operate such vibratory testing systems close to or at resonance, but for the lack of proper control mechanisms it has proven difficult and unsatisfactory because the well-known resonance curve is usually steep and narrow so that the slightest variation of some condition of operation (e. g. changes in damping, in the modulus of elasticity, or in the spring constant of the structure under test) will change the location or the slope of the resonance curve and thereby result in substantial changes in the amplified load induced in the structure, although the applied load may be held.

It is one object of my invention to utilize the force amplifying characteristics of a vibrated test member in the vicinity of its resonance and yet at the same time maintain the amplified force at a desired value notwithstanding the normally adverse characteristics of the resonance curve. In fact, in my present invention I seize upon and utilize these very characteristics by functionally inter-relating them to the applied force to suitably vary the latter to maintain the desired amplified force.

Another object is to provide an improved apparatus and control whereby any part of the resonance curve off from the peak thereof may be used as a basic control point for maintenance of a predetermined force in the specimen or structure.

A further object is to provide an improved electronic control system that is relatively simple and effective for automatically controlling the frequency of oscillation of an applied force so as to keep the specimen or structure vibrating to produce a desired stress result regardless of changes in the natural period of vibration of the structure during vibration.

In the preferred but illustrative embodiment of my invention disclosed herein, I mount a suitable electrical impedance type strain responsive device on either the test member or a dynamometer connected thereto so that the strain device is responsive to the vibratory stresses induced in the test member or dynamometer and then control a normally balanced electronic circuit by the strain device whereby when the strain deviates from a desired value the electronic circuit adjusts the applied force to restore the induced vibratory force within the test member to the desired value.

Other objects and advantages will be more apparent to those skilled in the art from the following description of the accompanying drawings in which:

Fig. 1 represents a diagrammatic illustration of an oscillator-driven fatigue machine system incorporating the invention;

Fig. 2 represents an illustrative resonance curve of the test specimen of Fig. 1;

Fig. 3 represents an illustrative compound resonance curve of the test specimen of the system of Fig. 1, representing a primary and two secondary resonance conditions;

Fig. 4 represents a diagrammatic illustration of a lever type fatigue machine system incorporating the invention;

Fig. 5 represents a diagrammatic illustration of a structure to be tested under repeated loads of constant magnitude, forming part of a system incorporating the invention;

Fig. 6 represents a circuit diagram of an electronic control system such as may be used with any of the preceding figures for controlling the variation in applied load or stress in accordance with slight variations in the magnitude of forces in the test device, and Fig. 7 represents a fragmentary elevation of an illustrative test specimen showing the disposition of parts of the strain gauge bridge assembly on opposite sides thereof for response to alternating force in the specimen.

Referring to Fig. 1, there is disclosed a test specimen comprising the cylinder 10, subjected to any kind of vibratory stresses, including direct stresses, (tension-compression), torsional stresses, or bending stresses, as by means of an oscillator 11 driven by a motor 12, one form among possible others of such an oscillator being shown in Lazan Patent No. 2,366,342, issued January 2, 1945, filed April 25, 1942. The motor would of course be of variable speed, the control of which is the means for controlling the forces in the specimen 10. Changing the speed of the motor 12 and thus of the oscillator changes the frequency of the imparted vibrations. Usually it will also incidentally change the amplitude of the vibrations with the change in frequency, but this is not consequential. If desired, any desired sort of combined motor and oscillator having constant amplitude for a whole range of frequencies may be used, but in most cases this is not essential, as the point of interest is in the maintained force of oscillation after exposure of the input vibration to the major part of the resonance amplification factor as will become more clear.

A dynamometer 13 is provided which is arranged to furnish an electrical output which is a direct function of the load exerted upon it. It will be understood that the dynamometer 13 may use bonded wire type resistance gages, such as are shown and described in United States Patent No. 2,292,549 to Simmons which respond to deformation by changes of resistance, or it may include gages, quartz crystals or other piezo electric devices, magnetic, capacitor, magneto-striction devices or any other device which can produce or modify electrical currents or impulses when subjected to dynamic forces. As shown, illustratively, Fig. 6, four of the bonded wire type resistance gages are combined in a bridge circuit for application to a test specimen. The disposition of such strain gauge bridge with an arm thereof on opposite sides of a test specimen 22, is shown in Fig. 7. The usually minute electrical output of the dynamometer 13 is amplified in conventional or other amplifying circuits 14, as shown illustratively in detail in Fig. 6, and the amplified output of the circuit 14 is a function of the load in the specimen 10. When the properly calibrated knob 15 is properly adjusted or set the standard or criterion voltage output of the amplifier circuit 14 is established to which it is held as a certain predetermined datum value before starting the actual test. Any differences in either sense between the impressed voltage from amplifier 14 and that set by the control knob 15 actuates an electrical drive 16 controlling the speed of the motor 12 through a wide but stepless range of speeds. This is rendered possible, for purely illustrative instance, by providing that electrical drive 16 be an electronic variable speed motor control such, for example, as that sold by General Electric Co., as shown and described, for instance, in General Electric Company catalogue GEA 4098, New Electronic Variable Speed Drive, GE Thy-Mo-Trol. The principle of these devices is that the D. C. motor 12 is controlled by grid controlled gas filled tubes to convert A. C. to controlled D. C., thus providing variable armature and field voltages for operating the D. C. motor 12 in a stepless wide range of speeds in response to the output of amplifier 14.

In considering the effects of the system just described, upon the test specimen 10, it will be apparent that at some speed or frequency of the oscillator the specimen will attain a primary or initial resonance, and its curve of resonance will have a peak in amplitude of force which is of practical infinity if the specimen 10 is not damped at all, will have a flattened peak with high damping, and with small damping will have the illustrative curve shown in Fig. 2. This will be the same curve as is marked "Primary Resonance" in Fig. 3. In both of these it will be observed that point $a$ on one side of the curve is at a frequency very close to that of the primary resonance, so that the magnitude of force produced by the test specimen is very high, but it is sufficiently far from that at actual resonance for a very slight change in frequency in either direction from the frequency point $a$ to either increase toward resonance with a consequent rapid increase in the magnitude of the alternating force produced by the specimen 10, or decrease away from resonance with a consequent rapid decrease in the magnitude of such force. If, in contrast to this, the control point were at the peak of resonance itself, it would only be possible to effect control in one direction, as change of frequency in either direction from resonance would only decrease the magnitude of alternating force in the test specimen 10.

In considering the problems of attaining constant force in test specimens, as 10, of Fig. 1, it must be recognized that the mechanical properties of the materials of the test pieces 10 may change during a vibration test, as for instance as regards its damping capacity, the dynamic modulus of elasticity, the temperature, etc., with a consequent direct effect upon the natural frequency of vibration of the system. These all combine to effect a change in the resonance curve of the test piece, which causes the problem. In Fig. 3, there is illustrated a compound curve comprised of two curves slightly off center or eccentric to each other, of which the hypothetical curve marked "Primary resonance" is the initial resonance condition at the start of the test, and the other, marked "Secondary resonance," is an actual final or transitional resonance curve based upon the changed natural period or natural frequency of the test piece. In considering these curves reference will be made to the fundamentals underlying the phenomena of these dynamic tests.

Let
$Po$ = magnitude of alternating force produced by oscillator 11.
$Ps$ = magnitude of alternating force produced in test specimen 10.
$Fo$ = frequency of alternating force produced by oscillator 11.
$Fn$ = natural frequency of vibration in the system.
$M$ = mass of oscillator and other objects partaking of vibration.
$Ks$ = spring constant of specimen or structure.

Then from elementary vibration theory $$Ps = \frac{Po}{1 - \frac{Fo^2}{Fn^2}} \qquad (1)$$

Where $$Fn = \sqrt{\frac{Ks}{M}}$$

Equation 1 defines the well-known resonance curve with no damping present, but in general it also holds true for small damping as is represented by the curve of Fig. 2. Referring to this curve it will be seen that in the vicinity of resonance, say at point $a$, $Ps$ is several times larger than $Po$. This ratio is known as the amplification factor and varies widely between different materials.

Thus in certain metal structures amplification factors in excess of 100 have frequently been attained and observed in the vicinity of resonance, whereas in certain plastics having high damping capacity the resonance amplification factor may be of the order of magnitude of 10.

In certain tests, such as fatigue tests of materials or structures it is desirable that the particular resonance amplification of the particular instant material be used to facilitate and speed up the tests, yet it is extremely important that the force $Ps$ remain unchanged throughout the test. Of course, it is possible to keep $Po$ at a constant value, but, as already pointed out, exposure to vibrations effects changes in $Fn$, which therefore effects changes in the force $Ps$ despite the constancy of value of $Po$. These changes in $Ps$ are very marked, even with minute changes in either $Fn$ or $Fo$, near resonance. Note in Fig. 3 that the value of $Fo$ marking the point $a$ on the primary resonance curve of Fig. 3, is the same as that of point $a'$ on the secondary resonance curve, but the value $Ps$ has been tremendously changed. As a matter of fact, to maintain $Ps$ at the same value it has at point $a$ of the primary resonance curve, after the value of $Fn$ has changed under stress and other conditions, to justify the secondary resonance curve, the value of $Fo$ will have to increase to a degree such that it intersects the secondary curve at a point $c$ representing the same $Ps$ value as initial point $a$. It is to maintain points $a$ and $c$ on the same horizontal line on the chart that the invention herein is designed and this is accomplished regardless of the number of secondary curves that may be developed with continued testing of the test specimen, as the value of $Fn$ may continue to change.

It is recognized that previous methods have been proposed in endeavors to maintain the constancy of the specimen force $Ps$, by arranging systems in which $Ps=Po$, but these are of extremely limited application as they cannot take advantage of the large amplification factors provided by resonant or near resonant vibrations which enable a relatively small oscillator to test a large structure.

The systems of the invention, as illustratively disclosed by Fig. 1, for example, are arranged to operate at any part of the resonance curve. For instance, referring to Figs. 2 and 3, it will be appreciated that when operating below resonance, say at or about point $a$ of those figures, in which the magnitude of force increases or decreases as the speed of frequency increases or decreases, th electronic circuit is so designed that with a drop in specimen stress $Ps$, there is a corresponding drop in dynamometer voltage output, and the motor 12 and oscillator 11 are synchronously speeded up. This causes the vibrating system to progress from a point instantaneously just below $a$ back to $a$ or toward resonance and actually toward $c$ on the secondary resonance curve which at that moment is a function of the actual existing value of $Fn$. This reestablishes the value of $Ps$. Actually, the "follow-up" is usually so quick that there has been no appreciable deviation, and certainly not such deviation as would upset the test results. If, on the other hand, the effective value of $Ps$ representing the force magnitude of the specimen becomes larger than that for which the system is pre-set, as when the value of $Ps$ at point $a$ rises above the $a$ level, the voltage from the dynamometer will become higher than the predetermined comparative set value, established by knob 15, and the electronic circuit will produce a drop in the speed of motor 12, and the oscillation frequency of the oscillator will decrease away from resonance and toward decrease in specimen stress with a corresponding proportional decrease in $Ps$.

Thus the voltage from the dynamometer as a function of the stress in the test specimen can be maintained at whatever constant may be predetermined and set by the knob 15 of the system.

It is not to be understood that the point on the resonance curve from which control is secured need always be on the approach toward resonance, as it will work in an analogous but reversed way, for instance, at the point $b$ on the side of the curve above resonance as shown in Fig. 2. In this latter situation the electronic circuit is so arranged that a drop in voltage from the dynamometer effects a decrease in speed of the motor 12 and therefore a decrease in the frequency of th oscillator, with a consequent approach in reverse toward resonance with an increase in the force $Ps$. Conversely, using the point $b$, an increase of dynamometer voltage increases the motor speed, and therefore the frequency of the oscillator, which thus moves away from resonance with a consequent decrease in the force $Ps$.

The same principles attach to the other devices shown. Thus, referring to Fig. 4, which is a lever type of fatigue machine, there is provided a lever 17 which amplifies the force applied by the oscillator 11, driven by the motor 12, applied through flex-plates 18 to the test specimen 20, and which force $Ps$ is incident upon the dynamometer 13, the output of which is amplified at 14, etc., similarly to the identical instrumentalities of Fig. 1. The test device of Fig. 4 includes a heavy stiff frame member 21 as shown.

The system shown in Fig. 5, contains the same agencies as before, using the same reference characters, but the test device is preferably a test or a real bridge section 22 in a bridge structure, for instance, and the dynamometer 13 may be at any point, on the structure 22, which responds with a force $Ps$ to the vibrations near resonance imposed by the oscillator 11, driven by motor 12, controlled by electronically controlled variable speed motor 16, and the output of which is controlled by the differential between the established predetermined voltage and the output of the dynamometer 14.

Reference has been made to the electronic circuit including the dynamometer and its circuit. While this may obviously be comprised of any desired system, a simple but effective circuit by which prompt and accurate control can be secured is illustrated in Fig. 6. Referring to this circuit there is provided, first, and illustratively, a bridge sub-circuit 23 containing two or more of the bonded wire resistance type gages and disposed, again purely illustratively, with one arm of the bridge on each of opposite sides of a stressed test piece or specimen, so that the variation in resistance due to elongation on one side is augmented by the variation in resistance due to compression on the other. An oscillator 19 is provided which supplies both the gage bridge and the control R1, through the transformer 24. The control R1 is coordinated with and adjusted by the presetting control knob 15 of the earlier figures. The output of amplifying tube 25 from the bridge 23 and amplifier 29 is therefore proportional to the strain on the bridge circuit and therefore to the magnitude of force on the test piece, as will be clear. This output is rectified by rectifier 26, from which it passes to the input of electronic variable speed control 16, previously discussed. The output of the amplifier 27 is passed through rectifier 28 from which it also passes to the input of control 16. It will be clear that when the output of the gage bridge 23 through rectifier 26 equals the output of the amplifier 27 passing through rectifier 28, which latter value is determined by adjustments of control R1 by knob 15, the input of control 16 is zero and the speed of the D. C. motor 12 remains constant and unaffected. With even a slight change in magnitude of the alternating force of the test piece, either toward or from its level of holding magnitude a, or b, the output of the gage bridge will change. If the output goes either up or down, the input to the control 16 will become a finite value of either positive or negative polarity. This input will cause the motor 12 either to speed up or slow down, thus controlling the magnitude of the alternating force developed in the test specimen by controlling the frequency of oscillator 11 with reference to the instantaneous resonance of the test piece.

It will of course be understood that various changes in details of construction and arrangement of parts may be made by those skilled in the art without departing from the spirit of the invention as set forth in the appended claims.

I claim:

1. Dynamic testing apparatus comprising, in combination, an oscillator for applying a vibration force to a member under test so as to induce an amplified alternating force in the test member, an electric motor for driving the oscillator at a variable frequency, a dynamometer for furnishing a voltage output as a function of the induced alternating force developed in the test member, and electrical sensitive means controlled by said output voltage for varying the speed of the said electric motor automatically in response to variations in the dynamometer voltage output in either direction from a predetermined value thereby to establish an oscillator speed as a direct function of a predetermined alternating force developed in such test member.

2. Dynamic testing apparatus comprising, in combination, a bridge circuit comprising elements operatively associated with a specimen and responsive to strain therein so that its variations are a function of an alternating force generated in a test piece by vibrations applied thereto, an electric motor, an oscillator driven by the motor and connected to the test piece to apply said vibrations thereto, and electronic circuit operatively associated with the bridge circuit and with the motor and including a balancing device, means for transmitting the output of the bridge circuit to one part of the balancing device, a control adjustable to transmit an adjustable output to said balancing device so that the output of the bridge circuit balances the adjustable output when the alternating force generated in the test piece is a desired function of an amplification factor almost as high as it is at an initial condition of resonance in such test piece, and means controlled by the balancing device in the electronic circuit for changing the speed of the said motor in accordance with unbalancing of the electronic circuit to change the speed of the oscillator in order to change the output of the bridge circuit to equal and balance with that of the said adjustable control.

3. In testing machines an electronic control circuit comprising a device having a variable D. C. output, a D. C. motor in the output of said device, two opposed rectified circuits leading to the device, an oscillator common to both circuits, one of said circuits including a bridge circuit having elements for association with a test piece and responsive to strain therein to vary the output thereof in accordance with changes in the alternating force developed in such test piece, said other circuit including an adjustable control to balance the output of the bridge circuit when the bridge circuit output is a predetermined proportional part only of the alternating force developed in the test piece at or near resonance, said device driving said electric motor at a constant speed so long as the said two circuits are balanced, but accelerating or decelerating the electric motor as the two circuits unbalance in one sense or the other due to the changes in alternating force developed in the test piece, and means of variable frequency driven by said motor and effective on such test piece to change the alternating force to restore the alternating force to its said predetermined proportional part pursuant to a fluctuation in the developed force in such test piece.

4. Dynamic testing apparatus comprising, in combination, an oscillator for applying a vibration force to a member under test so as to induce an amplified alternating force in the test member, a power mechanism for driving the oscillator at a variable frequency, an electrically responsive dynamometer connected to the test member to furnish an electrical output as a function of the induced alternating force developed in the test member, and electrical sensitive means controlled by said electrical output for varying the frequency of said power mechanism automatically in response to variations in the dynamometer electrical output in either direction from a predetermined value thereby to establish an oscillator speed as a direct function of a predetermined alternating force developed in the test member.

5. The combination set forth in claim 4 further characterized in that the oscillator is connected to the test member as a substantially rigid integral part thereof to oscillate therewith.

BENJAMIN J. LAZAN.

REFERENCES CITED

The following references are of record in the file of this patent:

UNITED STATES PATENTS

| Number | Name | Date |
| --- | --- | --- |
| 1,556,201 | Busemann | Oct. 6, 1925 |
| 1,665,822 | Shimizu | Apr. 10, 1928 |
| 2,178,252 | Förster | Oct. 31, 1939 |
| 2,243,413 | Buckingham | May 27, 1941 |
| 2,249,649 | Fielding | July 15, 1941 |
| 2,350,722 | Buckingham | June 6, 1944 |
| 2,411,450 | Miller | Nov. 19, 1946 |

OTHER REFERENCES

Siemens-Zeitschrift (Siemens & Halske, Siemens-Schuckert), 11. Heft, Berlin, November 1931, Jahrgang 11, pp. 489 through 494. (A photostatic copy is available in Div. 36.)